United States Patent
Park

(10) Patent No.: US 9,636,991 B2
(45) Date of Patent: May 2, 2017

(54) POWERTRAIN FOR HYBRID VEHICLE

(71) Applicant: Hyundai Motor Company, Seoul (KR)

(72) Inventor: Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 9 days.

(21) Appl. No.: 14/694,810

(22) Filed: Apr. 23, 2015

(65) Prior Publication Data

US 2016/0144706 A1    May 26, 2016

(30) Foreign Application Priority Data

Nov. 25, 2014  (KR) .................. 10-2014-0165019

(51) Int. Cl.
*B60K 6/54* (2007.10)
*B60K 6/387* (2007.10)
*B60K 6/365* (2007.10)
*B60K 6/445* (2007.10)
*F16H 3/72* (2006.01)
*B60K 6/38* (2007.10)
*F16H 37/08* (2006.01)

(52) U.S. Cl.
CPC ............... *B60K 6/54* (2013.01); *B60K 6/365* (2013.01); *B60K 6/387* (2013.01); *B60K 6/445* (2013.01); *F16H 3/728* (2013.01); *B60K 2006/381* (2013.01); *F16H 2037/0873* (2013.01); *Y02T 10/6239* (2013.01); *Y02T 10/76* (2013.01); *Y10S 903/911* (2013.01)

(58) Field of Classification Search
CPC ....................................................... B60K 6/54
See application file for complete search history.

(56) References Cited

U.S. PATENT DOCUMENTS

| 6,159,127 | A | 12/2000 | Loeffler et al. | |
|---|---|---|---|---|
| 6,558,283 | B1 | 5/2003 | Schnelle | |
| 6,634,986 | B2 * | 10/2003 | Kima | B60K 6/365 475/5 |
| 6,840,341 | B2 * | 1/2005 | Fujikawa | B60K 6/365 180/65.25 |
| 8,512,187 | B2 | 8/2013 | Puiu | |
| 8,734,281 | B2 | 5/2014 | Ai | |

(Continued)

FOREIGN PATENT DOCUMENTS

| JP | 2005-132365 A | 5/2005 |
|---|---|---|
| JP | 2006-77859 A | 3/2006 |

(Continued)

OTHER PUBLICATIONS

KR 1020140079242 (Lee, Chang Wook)—Power Transmission System of Hybrid Electric Vehicle (Jun. 26, 2014).*

*Primary Examiner* — Jacob S Scott
*Assistant Examiner* — Tinh Dang
(74) *Attorney, Agent, or Firm* — Morgan, Lewis & Bockius LLP

(57) ABSTRACT

A powertrain for a hybrid vehicle may include a first planetary gear set including a first rotation element connected to a first motor to be operated as an input element, a second rotation element intermittently connected to the first motor through a first friction member and connected to an output shaft to be operated as a selective input element or a selective output element, and a third rotation element operated as a selective fixing element by a second friction member.

6 Claims, 6 Drawing Sheets

(56) References Cited

U.S. PATENT DOCUMENTS

| | | |
|---|---|---|
| 9,316,291 B2 * | 4/2016 | Lee .................... B60K 6/54 |
| 2003/0232678 A1 | 12/2003 | Yamauchi |
| 2008/0171625 A1 | 7/2008 | Goldschmidt et al. |
| 2009/0011887 A1 | 1/2009 | Komada |
| 2009/0170649 A1 | 7/2009 | Murakami |
| 2010/0000814 A1 | 1/2010 | Katsuta |
| 2010/0044128 A1 | 2/2010 | Oba |
| 2012/0310461 A1 | 12/2012 | Maruyama |
| 2015/0018152 A1 | 1/2015 | Kato |
| 2015/0111682 A1 | 4/2015 | Park |

FOREIGN PATENT DOCUMENTS

| | | |
|---|---|---|
| JP | 2007-69843 A | 3/2007 |
| JP | 2008-56236 A | 3/2008 |
| JP | 2008-174163 A | 7/2008 |
| JP | 2012-519617 A | 8/2012 |
| JP | 2013-86654 A | 5/2013 |
| KR | 10-2007-0079672 A | 8/2007 |
| KR | 10-0893438 B1 | 4/2009 |
| KR | 10-0996132 B1 | 11/2010 |
| KR | 10-1144501 B1 | 5/2012 |
| KR | 10-2012-0140099 A | 12/2012 |
| KR | 10-2013-0056128 A | 5/2013 |
| KR | 10-2013-0056640 A | 5/2013 |
| KR | 10-2013-0066225 A | 6/2013 |
| KR | 10-2014-0080638 A | 7/2014 |
| KR | 10-1428421 B1 | 8/2014 |
| WO | WO 2010101296 A1 | 9/2010 |

* cited by examiner

POWERTRAIN FOR HYBRID VEHICLE

CROSS REFERENCE TO RELATED APPLICATION

The present application claims priority of Korean Patent Application Number 10-2014-0165019 filed on Nov. 25, 2014, the entire contents of which application are incorporated herein for all purposes by this reference.

BACKGROUND OF THE INVENTION

Field of the Invention

The present invention relates to a powertrain used for a hybrid vehicle.

Description of Related Art

Since a hybrid vehicle, which is a vehicle driven by a combination of electrical power and a power source of an internal combustion engine, is controlled so as to be operated at a point of high efficiency of a system by an engine and an electrical motor to thereby efficiently reduce exhaust gas while having excellent efficiency, it has been implemented as alternative of an environment-friendly vehicle.

A power branch method of the above-mentioned hybrid vehicle includes a mechanical flow in which power of the engine is directly transferred to an output shaft using a power branch apparatus that branches a power flow such as planetary gear set and an electrical flow in which a generator is driven using the power of the engine and a battery is charged with the generated power or a motor is driven by energy of the charged battery.

The power branch type of a hybrid system as described above has advantages that the engine is able to be operated independently from the output shaft, the engine may be freely turned on/off during the driving, and it is possible to implement an electrical vehicle mode.

In addition, since the power branch type of the hybrid system has advantages that the engine may be efficiently driven by an electrically variable transmission (EVT) effect due to two motor generators and the motor has a constant output in response to speed, it does not basically require a transmission.

However, in order to keep the highest speed of the vehicle to be high and secure low speed torque, the transmission is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a powertrain for a hybrid vehicle capable of improving driving performance of the vehicle by multi-staging a shift stage formed by driving a motor, and reducing costs and weight by decreasing capacity of the motor.

According to an aspect of the present invention, there is provided a powertrain for a hybrid vehicle including a first planetary gear set including a first rotation element connected to a first motor to be operated as an input element, a second rotation element intermittently connected to the first motor through a first friction member and connected to an output shaft to be operated as a selective input element or a selective output element, and a third rotation element operated as a selective fixing element by a second friction member.

The powertrain may further may include a second planetary gear set including a first rotation element connected to a second motor to be operated as a selective input element or a selective fixing element, a second rotation element having power of an engine provided thereto to be operated as an input element, and a third rotation element connected to the output shaft to be operated as an output element.

In the first planetary gear set, the first rotation element may be a first sun gear, the second rotation element may be a first carrier, and the third rotation element may be a first ring gear.

The first friction member may be a dry clutch and the second friction member may be a dog clutch that is able to be selectively fastened between a transmission case and the third rotation element or a synchromesh type synchronizer.

The first carrier may have an external gear connected thereto, and the external gear may be provided to be engaged with a step-down gear provided in the output shaft.

In the second planetary gear set, the first rotation element may be a second sun gear, the second rotation element may be a second carrier, and the third rotation element may be a second ring gear.

The first rotation element of the second planetary gear set may have a third friction member connected thereto so as to configure the first rotation element to be operated as the selective fixing element by the third friction member.

The third friction member may be a brake fixed to a transmission case, or a dog clutch that is able to be selectively fastened between the transmission case and the first rotation element or a synchromesh type synchronizer.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
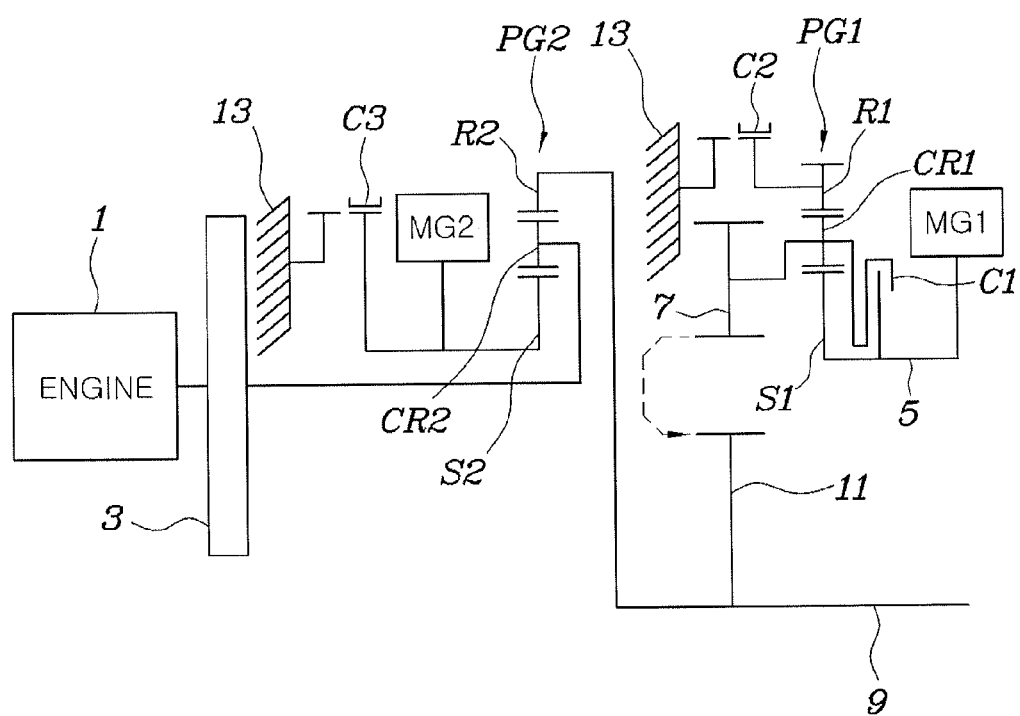
FIG. 1 is a diagram schematically illustrating a layout of a powertrain for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

A powertrain for a hybrid vehicle according to an exemplary embodiment of the present invention is configured to include a first motor MG1 and a first planetary gear set PG1.

Describing the present invention in detail with reference to FIG. 1, the first planetary gear set PG1 is configured to include a first rotation element connected to a first motor MG1 to be operated as an input element, a second rotation element intermittently connected to the first motor MG1 through a first friction member C1 and connected to an output shaft 9 to be operated as a selective input element or a selective output element, and a third rotation element operated as a selective fixing element by a second friction member C2.

For example, in the first planetary gear set PG1, the first rotation element may be a first sun gear S1, the second rotation element may be a first carrier CR1, and the third rotation element may be a first ring gear R1.

In addition, the first friction member C1 may be a dry clutch. In addition, the second friction member C2 may be a dog clutch that may be selectively fastened between a transmission case 13 and the third rotation element, or a synchromesh type synchronizer.

In addition, an external gear 7 is connected to the first carrier CR1 so as to be rotated therewith in a state in which a relative rotation with the first carrier CR1 is constrained, and is provided to be engaged with a step-down gear provided in the output shaft 9, such that rotation power of the first motor MG1 that is input through the external gear 7 is stepped-down by an output gear 11 to rotate the output shaft 9.

That is, the first sun gear S1 is connected to the first motor MG1 by a motor input shaft 5 so as to be rotated and operated by power provided from the first motor MG1, the first carrier CR1 has one end connected to the motor input shaft 5 through the first friction member C1 and the other end connected to the external gear 7 to thereby serve to directly output the power of the first motor MG1 to the external gear 7 depending on a gear ratio change of the planetary gear set or step-down and output the power provided from the first sun gear S1, and the first ring gear R1 is connected to the second friction member C2 to selectively perform a brake.

That is, by the above-mentioned configuration, since the present invention may implement one-level and two-level driving of an EV mode by a selective brake operation of the first friction member C1 or a selective intermittent operation of the second friction member C2, EV driving performance may be improved by forming a shift stage according to the motor driving to be multi-staged and costs and weight of the motor may be reduced by decreasing capacity of the motor.

Meanwhile, the present invention may be configured to further include a second planetary gear set PG2 that may branch and provide the power of an engine 1 or a second motor MG2 into the output shaft 9.

Describing in detail with reference to FIG. 1, the second planetary gear PG2 may be configured to include a first rotation element connected to the second motor MG2 to be operated as a selective input element or a selective fixing element, a second rotation element having power of the engine 1 provided thereto to be operated as the selective input element, and a third rotation element connected to the output shaft 9 to be operated as the selective output element.

For example, in the second planetary gear set PG2, the first rotation element may be a second sun gear S2, the second rotation element may be a second carrier CR2, and the third rotation element may be a second ring gear R2.

In addition, a third friction member C3 is connected to the first rotation element of the second planetary gear set PG2, such that the first rotation element may be configured to be operated as a selective fixing element.

Figure 6:
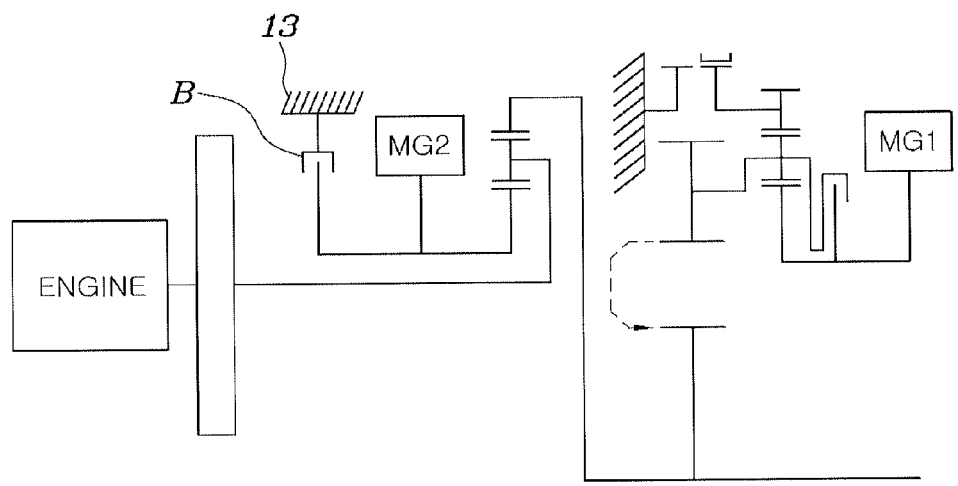
FIG. 6 is a diagram illustrating a structure of a powertrain for a hybrid vehicle according to another exemplary embodiment of the present invention.

In this case, the third friction member C3 may be a dog clutch that may be selectively fastened between the transmission case 13 and the first rotation element, or the synchromesh type synchronizer as shown in FIG. 1, or a brake B fixed to the transmission case 13 as shown in FIG. 6.

For example, in the case in which the dog clutch is used as the third friction member C3, the dog clutch may be stably fastened by controlling an RPM of the second motor MG2 (controlling the RPM to "0").

Figure 7:
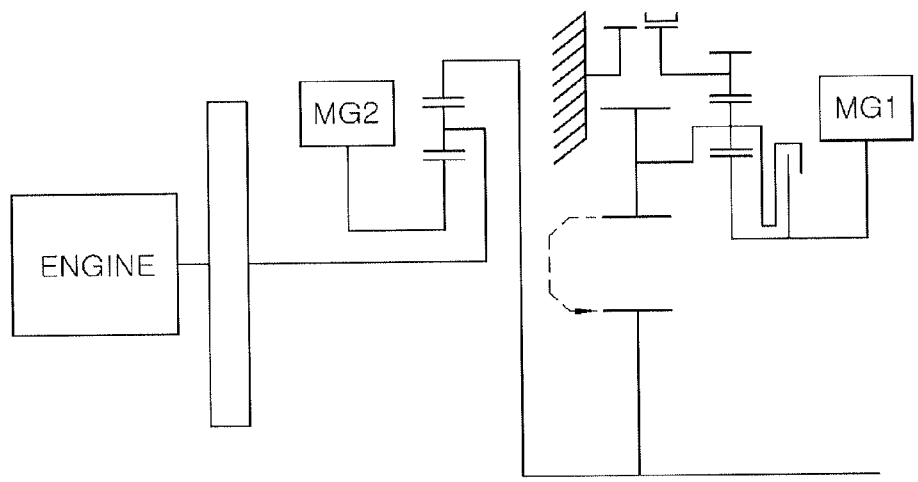
FIG. 7 is a diagram illustrating a structure of a powertrain for a hybrid vehicle according to another exemplary embodiment of the present invention.

In addition, as shown in FIG. 7, in the case in which the third friction member C3 is not used, upon driving at high speed in the engine EVT mode, there is loss of an electrical load, but the second sun gear S2 is fixed by controlling the second motor MG2, thereby making it possible to perform the driving.

Here, the first motor MG1 and the second motor MG2 may be a motor generator capable of providing power or generating electricity.

That is, the second sun gear S2 of the second planetary gear set PG2 may be connected to the second friction member C2 to perform the braking, the second carrier CR2 may be connected to the engine 1 to receive rotation power from the engine 1, and the second ring gear R2 may be connected to the output shaft 9 to transfer the rotation power to the output shaft 9.

In this case, a torsion damper 3 may be provided between the engine 1 and the second carrier CR2, so as to reduce torsional vibration.

Therefore, the present invention may implement the driving of the engine electrically variable transmission (EVT) mode or the engine overdrive (OD) mode by the selective braking operation of the second friction member C2, and the HEV mode is implemented by one-level and two-level combination driving of the EV mode to thereby form the shift stage to be multi-staged, whereby the high speed driving performance of the vehicle may be improved.

Hereinafter, a power flow for each driving mode using the present invention will be described.

<EV Mode>

Figure 2:
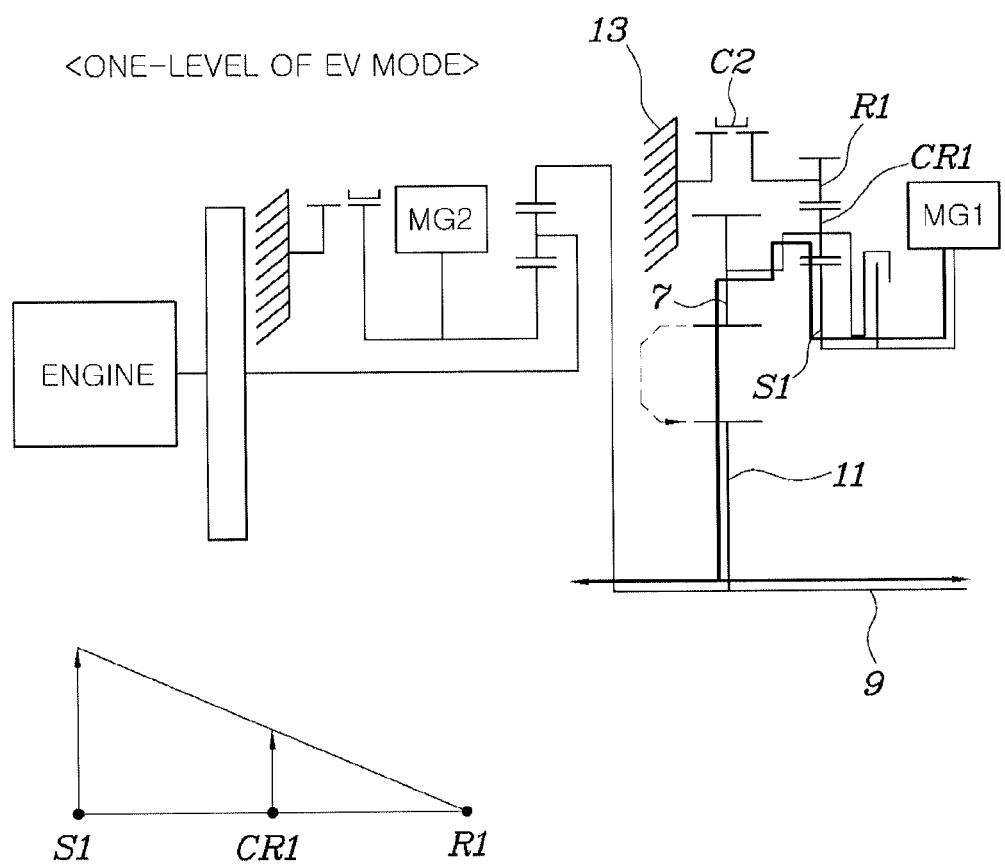
FIG. 2 is a diagram for describing a power flow upon one-level driving of an EV mode according to an exemplary embodiment of the present invention.

Referring to FIG. 2, the first sun gear S1 together with the motor input shaft 5 is rotated by the power provided from the first motor MG1. In this case, since the first ring gear R1 is fixed by the second friction member C2, the power input through the first sun gear S1 is stepped-down by the first carrier CR1 and is output through the external gear 7 and the output gear 11 engaged with the external gear 7, thereby forming one-level of an EV mode to perform the driving.

Figure 3:
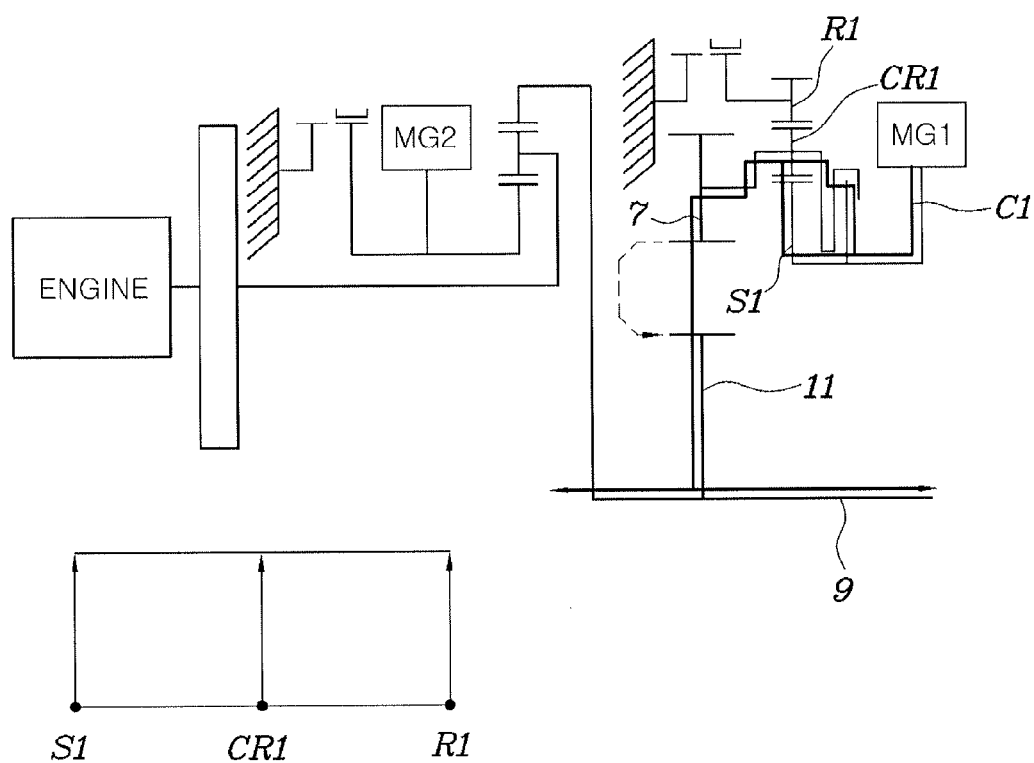
FIG. 3 is a diagram for describing a power flow upon two-level driving of the EV mode according to an exemplary embodiment of the present invention.

Next, referring to FIG. 3, the motor input shaft 5 and the first sun gear S1 are rotated by the power provided from the first motor MG1. In this case, if the first friction member C1 is coupled upon shifting from one-level of the EV mode to a two-level of the EV mode, the power is output through the external gear 7 and the output gear 11 while speeds of the first sun gear S1 and the first carrier CR1 are synchronized and the first planetary gear set PG1 is integrally rotated, thereby forming the two-level of the EV mode to perform the driving.

<Engine EVT Mode+EV Mode>

Figure 4A:
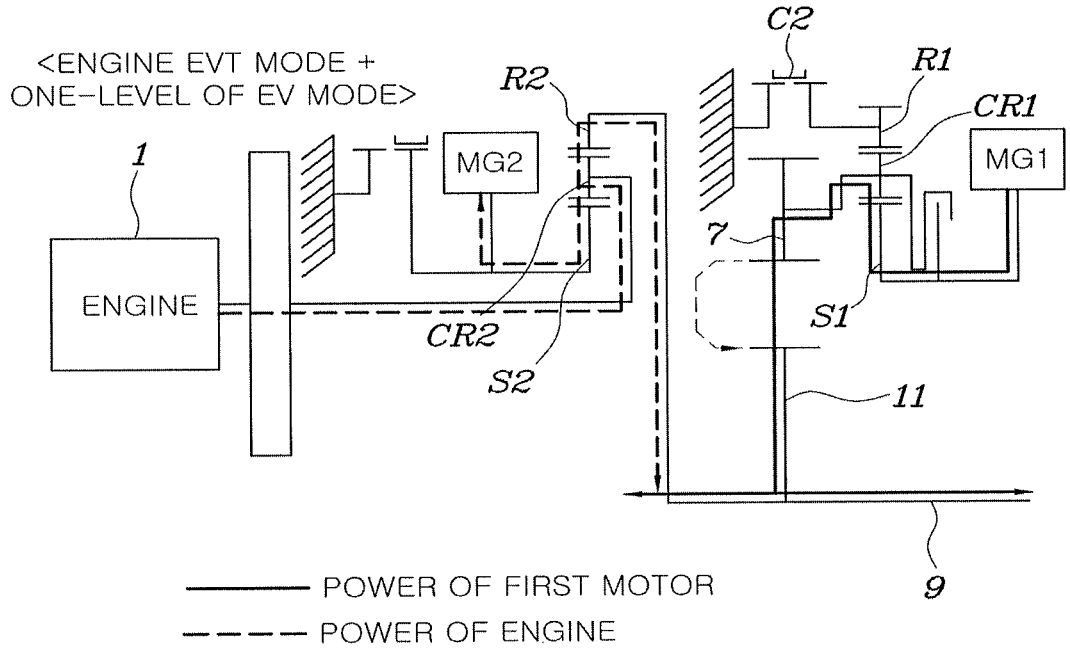
FIG. 4A and FIG. 4B are diagrams for describing a power flow upon an EV one-level and EV two-level driving in an engine EVT mode according to an exemplary embodiment of the present invention.

Referring to FIG. 4A, in the case in which the power of the engine 1 is input to the second carrier CR2, the power of the engine 1 may be branched (power-split) into the second motor MG2 and the output shaft 9 through the second sun gear S2 and the second ring gear R2 by a control of the second motor MG2 to be used to generate and output electricity, or the power of the second motor MG2 and the power of the engine 1 may be together provided to the output shaft 9.

However, FIG. 4A only illustrates a flow that the power of the engine 1 is branched.

Further, one-level driving of the EV mode as described above may be performed by the power provided from the first motor MG1, thereby forming a shift stage in which the engine EVT mode and one-level of the EV mode are combined to perform the driving.

Figure 4B:
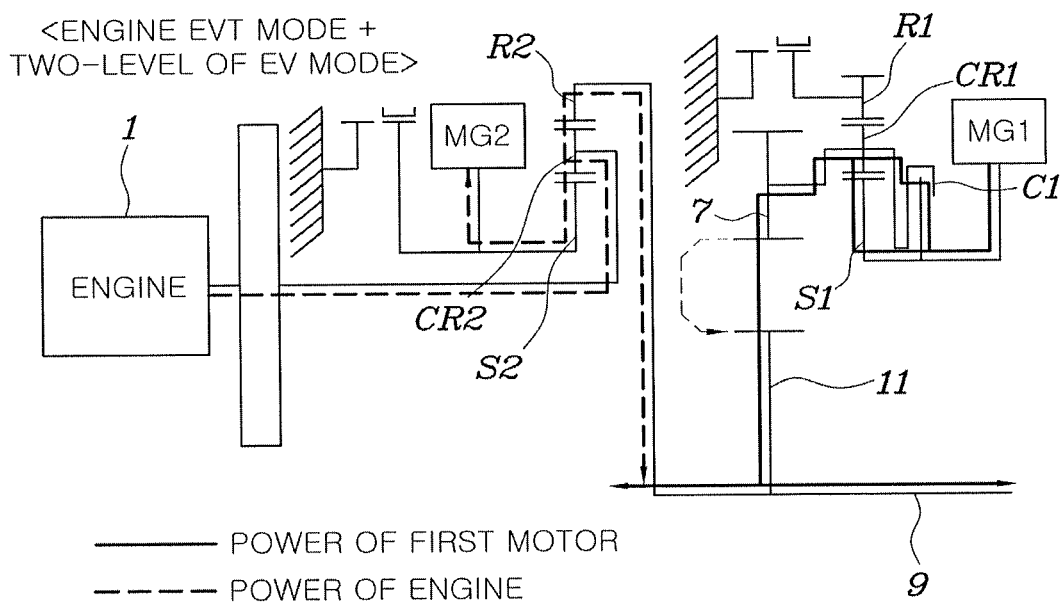

Next, referring to FIG. 4B, while the power of the engine 1 is input to the second carrier CR2, the power of the engine 1 may be branched or may be provided to the output shaft 9 together with the power of the second motor MG2 by the second planetary gear set PG2, similar to those described above.

Further, the two-level driving of the EV mode may be performed by a process of shifting from one-level of the EV mode to the two-level of the EV mode as described above by the power provided from the first motor MG1, thereby forming a shift stage in which the engine EVT mode and the two-level of the EV mode are combined to perform the driving.

<Engine OD Mode+EV Mode>

Figure 5A:
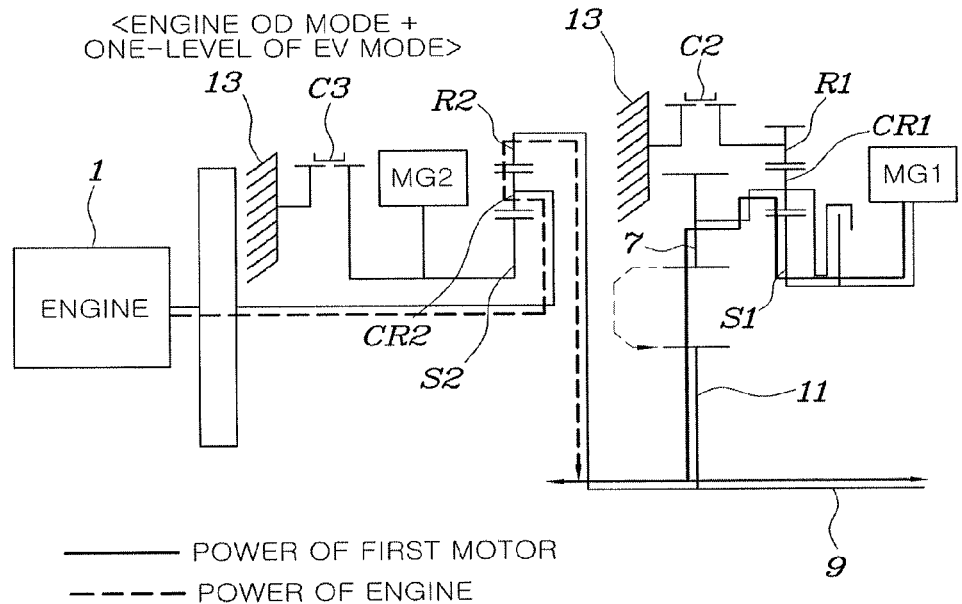
FIG. 5A and FIG. 5B are diagrams for describing a power flow upon an EV one-level and EV two-level driving in an engine OD mode according to an exemplary embodiment of the present invention.

Referring to FIG. 5A, in the case in which the power of the engine 1 is input to the second carrier CR2, since the second sun gear S2 is fixed by the third friction member C3, the power of the engine 1 is stepped-up and output through the second ring gear R2, so as to be provided to the output shaft 9.

Further, one-level driving of the EV mode as described above may be performed by the power provided from the first motor MG1, thereby forming a shift stage in which the engine OD mode and one-level of the EV mode are combined to perform the driving.

Figure 5B:
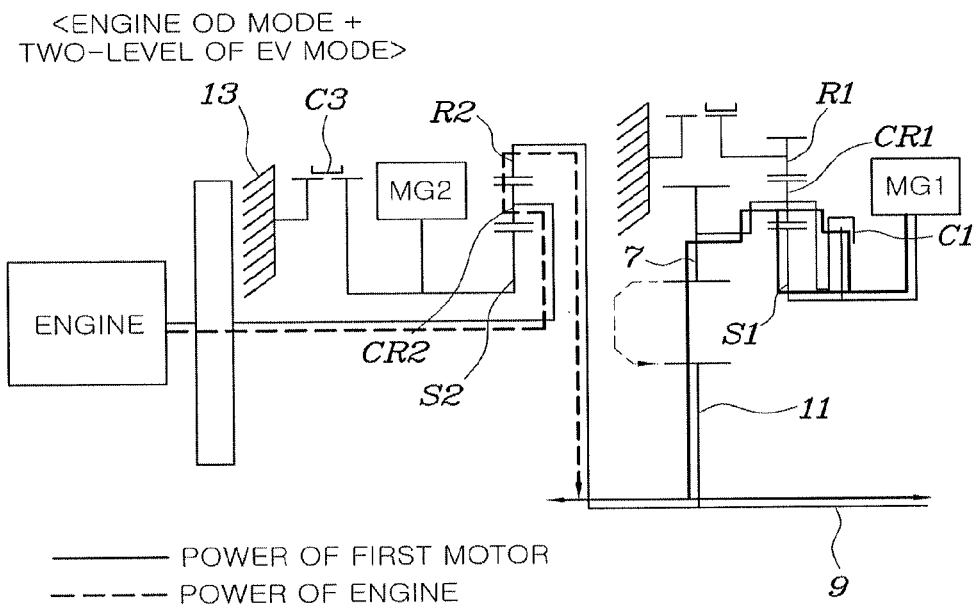

Next, referring to FIG. 5B, the power of the engine 1 is input to the second carrier CR2, and the power of the engine 1 is stepped-up through the ring gear R2 and provided to the output shaft 9, similar to those described above.

Further, the two-level driving of the EV mode may be performed by a process of shifting from one-level of the EV mode to the two-level of the EV mode as described above by the power provided from the first motor MG1, thereby forming a shift stage in which the engine OD mode and the two-level of the EV mode are combined to perform the driving.

Particularly, according to an exemplary embodiment of the present invention, in the case in which the high speed driving is performed in the above-mentioned engine OD mode, since it is not required to control the second motor MG2 in order to fix the second sun gear S2 by fixing the second sun gear S2 by the third friction member C3 to step-up the power of the engine 1, loss of the electrical load used to control the second motor MG2 is reduced, thereby assisting in improving fuel efficiency.

In addition, although not shown in the drawings, in the case in which the driving is performed in an engine solo driving mode of the engine EVT mode, the first motor MG1 is freewheeled by the first planetary gear set PG1, such that the electrical load necessary to rotate the first motor MG1 is not required, thereby also assisting in improving fuel efficiency.

According to the exemplary embodiment of the present invention, the driving of the engine electrically variable transmission (EVT) mode or the engine overdrive (OD) mode may be implemented, and the HEV mode is implemented by one-level and two-level driving of the EV mode to thereby form the shift stage to be multi-staged, whereby the EV driving performance and high speed driving performance of the vehicle may be improved and costs and weight of the motor may be reduced by decreasing capacity of the motor.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain for a hybrid vehicle, the powertrain comprising:
    a first planetary gear set including:
        a first rotation element connected to a first motor to be operated as an input element;
        a second rotation element intermittently connected to the first motor through a first friction member and connected to an output shaft to be operated as a selective input element or a selective output element; and
        a third rotation element operated as a selective fixing element by a second friction member; and a second planetary gear set including:
- a first rotation element connected to a second motor to be operated as a selective input element or a selective fixing element;
- a second rotation element having power of an engine provided thereto to be operated as an input element; and
- a third rotation element connected to the output shaft to be operated as an output element,
- wherein in the second planetary gear set, the first rotation element is a second sun gear, the second rotation element is a second carrier, and the third rotation element is a second ring gear.

2. The powertrain of claim 1, wherein in the first planetary gear set, the first rotation element is a first sun gear, the second rotation element is a first carrier, and the third rotation element is a first ring gear.

3. The powertrain of claim 2, wherein the first friction member is a dry clutch and the second friction member is a dog clutch that is configured to be selectively fastened between a transmission case and the third rotation element or a synchromesh type synchronizer.

4. The powertrain of claim 2, wherein the first carrier has an external gear connected thereto, and the external gear is provided to be engaged with a step-down gear provided in the output shaft.

5. The powertrain of claim 1, wherein the first rotation element of the second planetary gear set has a third friction member connected thereto to configure the first rotation element to be operated as the selective fixing element by the third friction member.

6. The powertrain of claim 5, wherein the third friction member is a dog clutch that is configured to be selectively fastened between a transmission case and the first rotation element or a synchromesh type synchronizer, or a brake fixed to the transmission case.

* * * * *